3,082,233
PROCESS OF PRODUCING FREE FLOWING ALUMINUM NAPHTHENATE AND PRODUCT THEREOF
James Lyons Biggart, deceased, late of Johannesburg, Transvaal, Republic of South Africa, by Dora Gertrude Biggart, executrix, Scarsdale, N.Y., assignor to National Research and Development Corp., New York, N.Y., a corporation of Delaware
No Drawing. Filed July 17, 1958, Ser. No. 749,298
2 Claims. (Cl. 260—448)

This invention relates to a process of producing naphthenic acid salts of aluminum, and more particularly to the production of aluminum naphthenates having over 7% by weight of aluminum therein.

Ordinarily freshly produced aluminum naphthenates are a sticky, pasty material difficult to wash free of impurities and to recover from the mother liquor. It has been found, however, that aluminum naphthenate prepared in the manner hereinafter described is a finely divided, free flowing, cream-colored powder which does not hydrolyze upon standing. This powder is insoluble in hot or cold water.

For the practice of the instant invention the critical factor is the readily measured percentage of aluminum in the finished soap, and to accord to the practice of the instant invention the completed soap should contain over 7% of aluminum. By and large such aluminum naphthenates appear to correspond to the mono-soap, namely $Al(OH)_2R$.

As is generally recognized by the art, the production of aluminum soaps is fraught with variations from batch to batch despite efforts to maintain uniform procedure. The instant invention contemplates a formulation procedure which is readily carried out and which gives reproducible results. This procedure is as follows:

A concentrated solution of caustic is slowly stirred into the naphthenic acid. The ensuing reaction causes the mixture to become very hot, and by the time all of the caustic solution has been added, the entire mass becomes a solid gel. It is important to note that the full amount of liquid in the reaction mix must become a solid lump within a few minutes of adding the full quantity of caustic solution. If this does not take place, the ultimate result will be a batch of ordinary aluminum naphthenate assaying a lower metal content than 7%.

The solid lump of sodium naphthenate is then dissolved in about seven times as much cold water and heated until complete solution is attained, the solution being clear and bright. Thereafter approximately an equal amount of an equally dilute aluminum sulfate solution is poured slowly into the naphthenate with constant stirring. A cream-colored, almost white, precipitate of aluminum naphthenate forms at once. The precipitate is permitted to settle for a few minutes and the clear aqueous solution drawn off. It is thereafter washed several times with fresh water and finally filtered. The product, which may be dried in a current of warm air or by any other suitable means, is a finely divided powder assaying over 7% aluminum.

The chief property of the aluminum naphthenate so produced is its ability to immediately form a clear, transparent gel in cold organic solvents by simple stirring. Small quantities of the aluminum naphthenate will sharply increase the viscosity of paints or varnishes giving them an attractive body. The aluminum naphthenate can similarly thicken lubricants and greases. To gel gasoline, it has an advantage over aluminum stearate in that the aluminum naphthenate gel remains unaffected by heat. In one particular test, some thin automotive lubricating oil had added thereto 2% of the aluminum naphthenate. There resulted a high viscosity (or heavy) oil. A beaker full of this heavy oil was heated on a Bunsen burner for over half an hour, but despite the application of heat the viscosity of the new oil did not change in any way, the oil getting neither thicker nor thinner.

The following specific example shall serve to illustrate the practice of the instant invention.

A concentrated caustic soda solution was prepared by dissolving 200 grams of sodium hydroxide in 175 cc. of water, forming 250 cc. of concentrated caustic solution. To 50 grams of naphthenic acid in a 100 cc. beaker 35 cc. (52.5 grams) of aforementioned caustic soda solution was added slowly with constant stirring. The reaction mixture became very hot and was completely gelled by the time all of the caustic soda solution had been added. The solid lump weighing 102.5 grams was subsequently dissolved by adding it to 750 cc. of cold water (in a two-liter beaker) and gently heating until complete dissolution had been attained.

Thereafter 900 cc. of a 10% solution of $$Al_2(SO_4)_3 \cdot 18H_2O$$

was slowly added with constant stirring. A light cream-colored precipitate of aluminum naphthenate formed at once. The precipitate was permitted to settle, clear water solution decantered off and the precipitate washed twice with fresh water. The precipitate was then filtered and dried in a current of hot air. The yield was 56.1 grams. Its aluminum content was 7.55%.

Inasmuch as formation of an actual gel of sodium naphthenate is important, the caustic solution concentration must be within a relatively narrow range of 50–55% NaOH. Also from about 65–75 cc. of such NaOH solution must be employed per hundred grams of naphthenic acid. Similarly the concentration of the aluminum sulfate in the precipitating solution should be within the range of about 5–15%, while the ultimate solution of sodium naphthenate should also be in about 5–15% concentration. The latter is achieved by dissolving the gel in about 5–10 times its weight of cold water.

The invention disclosed herein enables the production of less expensive, tack-free, quickly drying and stable printing inks and may be applied to many practical uses additional to those herein mentioned.

Having thus described the invention, what is claimed is:

1. The process for producing an aluminum naphthenate containing over 7% aluminum by weight, which comprises: adding a concentrated solution of caustic soda having between 50–55% NaOH therein to naphthenic acid in a ratio of about 65–75 cc. of said caustic solution per hundred grams of naphthenic acid, whereby the sodium naphthenate so produced is a solid gel, thereafter essentially substantially dissolving the gelled sodium naphthenate with up to about 10 times its weight of cold water and heating until dissolution, then slowly adding a 5–15% aluminum sulfate solution, and finally recovering therefrom the resulting precipitate of said high aluminum content aluminum naphthenate, in the form of finely divided free-flowing, non-hydrolyzing powder.

2. An aluminum naphthenate product assaying over 7% aluminum by weight, in the form of a finely divided free-flowing, non-hydrolyzing powder produced by the process of claim 1.

References Cited in the file of this patent

UNITED STATES PATENTS 2,356,340    Murphree  ---------------  Aug. 22, 1944
2,447,064    Gebhart et al.  ----------  Aug. 17, 1948